Sept. 2, 1969  S. R. SCRUBY ETAL  3,464,740
AXIAL GROOVE CONVEYING TUBE
Original Filed Feb. 3, 1967

Stanley R. Scruby
Donald J. McIver
INVENTORS

BY
ATTORNEY 3,464,740
AXIAL GROOVE CONVEYING TUBE
Stanley R. Scruby and Donald J. McIver, Houston, Tex., assignors, by mesne assignments, to Keystone Valve Corp., Houston, Tex.
Continuation of application Ser. No. 725,959, May 1, 1968, which is a continuation of application Ser. No. 613,882, Feb. 3, 1967. This application Nov. 25, 1968, Ser. No. 778,865
Int. Cl. B65g 53/34
U.S. Cl. 302—64      5 Claims

ABSTRACT OF THE DISCLOSURE

A low pressure pneumatic conveyor conduit with longitudinally serrated interior surface.

---

This application is a continuation of Ser. No. 725,959, filed May 1, 1968, now abandoned, which in turn is a continuation of Ser. No. 613,882, filed Feb. 3, 1967, now abandoned.

BACKGROUND OF THE INVENTION

Field of the invention

This invention is related to the art of material handling and more particularly to apparatus for pneumatically conveying particulate materials of a relatively soft nature, such as polyethylene and the like.

Description of the prior art

Many present day manufacturing processes involve the use of polyethylene and other similar materials. These materials in their raw state are usually in the form of small pellets or particles and may be handled through pneumatic conveying systems. However, there is a tendency for polyethylene to smear along the interior of the conveying conduits. Thus, a thin skin or streamer is formed which may subsequently peel off in large pieces to clog the conveying system or other equipment.

There have been several attempts to eliminate this skin forming problem in the past. U.S. Patent No. 2,784,038 has suggested that the interior of the conveying conduit be sandblasted or provided with closely spaced annular rings. The theory of this patent is that the abruptly descending velocity gradient in the annular zone between the conduit side walls and the main body of the air stream causes the particles to decelerate before hitting the conduit side walls. It is then reasoned that the reduced velocity will reduce the smearing effect. However, it can readily be seen that the reduction of velocity naturally reduces material flow. Economically speaking, this is not desirable since more power must be used to convey the same amount of materials. It is also expensive to manufacture pipe with annular rings or sandblasted interiors.

Another patent, U.S. Patent No. 3,117,821, has suggested the use of a groove between two ridges helically generated on the conduit side wall. It is stated that the material is continually worked away from the side walls to reduce the smearing problem. However, the formation of these grooves and ridges on the interior of a conduit is expensive. It is also felt that the continuous helical or swirling movement of the materials being conveyed results in a flow reduction.

SUMMARY OF THE INVENTION

The present invention overcomes the smearing effect of pneumatically conveyed polyethylene and similar materials through use of a new and improved conduit structure. The conduit employs uniform longitudinal serrations on its side walls. The serrations are so dimensioned that the size particles conveyed through the conduit cannot contact the valleys between the ridges. Thus, contact area is greatly reduced without increased friction and consequent decreased material flow as in previously attempted solutions.

The conduit structure of the invention may be economically manufactured by processes such as extrusion. This is also a definite advantage over conduit structure previously suggested.

DESCRIPTION OF THE PREFERRED EMBODIMENTS

Figure 1:
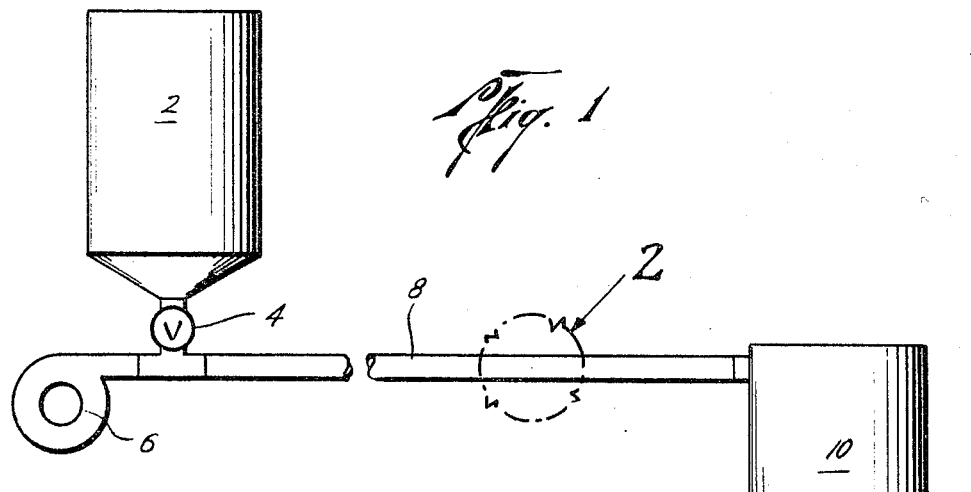
FIGURE 1 is a schematic view of a typical pneumatic conveying system embodying the present invention.

Referring first to FIGURE 1, a typical low pressure pneumatic conveying system is schematically represented. A supply bin 2 contains polyethylene pellets or other materials which are fed into a conduit 8 by feeder 4. Centrifugal blower 26 supplies an air stream which moves the pellets down conduit 8 to a receiving bin 10. Another feeder 12 may then be used to feed the pellets into a machine or apparatus for forming the polyethylene pellets into a useful product. These elements of a conveying system are well known in the art and with the exception of conduit 8 will not be further discussed.

Figure 2:
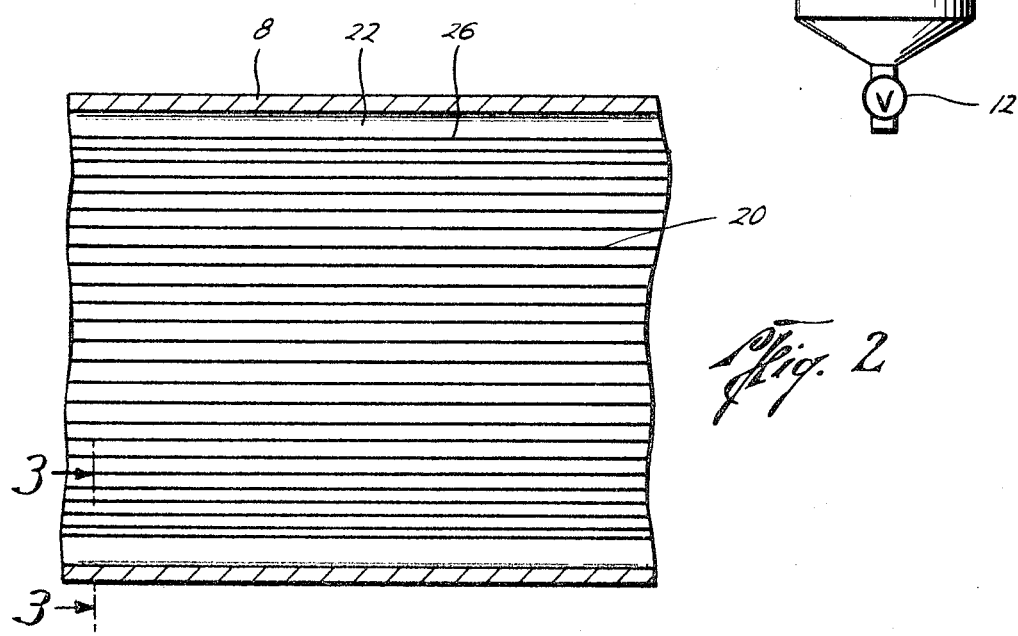
FIGURE 2 is an enlarged fragmentary side elevation in cross-section of the conduit shown in FIGURE 1 made according to the present invention.
Figure 3:
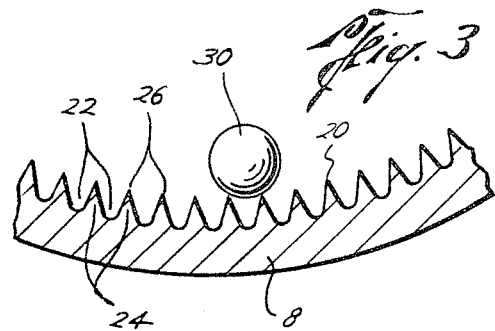
FIGURE 3 is an enlarged fragmentary end elevation in cross-section of the conduit shown in FIGURE 2.

Referring now to FIGURES 2 and 3, a preferred embodiment of the invention will be described. Conduit 8 may be of any cross-sectional shape desired. The particular embodiment shown is circular. Longitudinal serrations 20 comprising alternate valleys 22 and ridges 24 are uniformly spaced around the interior wall of conduit 8 to give a saw tooth cross-sectional appearance as in FIGURE 3. Conduit 8 may be conveniently and economically formed with these serrations 20 on its interior by known extrusion methods. Aluminum is readily adaptable to extrusion processing and is ideally suited for conveyor conduits. The distance between ridges 24 is governed by the size pellets 30 to be conveyed through the system. They are close enough to prevent pellets 30 from contacting the surfaces of valleys 22. The crests 26 of ridges 24 are relatively sharp, presenting a small area to be contacted by pellets 30.

As pellets 30 are conveyed by the air stream through conduit 8, they will be allowed to contact only the area of crests 26. Naturally, this is only a small percentage of the interior area of conduit 8. Thus, smearing is prevented simply by the drastic reduction of contact area. It is also felt that the valleys or grooves 22 of serrations 20 also provide an air cushion or shock absorbing effect which also aids in reducing smearing. Tests have proven the invention to be very effective in solving the smear problem.

Not only does the invention solve the smear problem, it does so without reduction of material flow. The structure of conduit 8 does not increase frictional resistance as the helical groove and ridges or the rugae of sandblasting etc. suggested in other patents. In fact, the frictional resistance of the present invention is no greater than a smooth wall conduit.

Thus, it can be seen that, the problems of conveying polyethylene pellets or the like are solved by the present invention without reduction of material flow. It can also be understood that, a conveyor conduit made according to the invention may be economically manufactured.

Many modifications of the present invention may be made by one skilled in the art with reference to this disclosure. It is, therefore, intended that that the invention be limited only by the scope of the claims contained herein.

We claim:
1. In a pneumatic conveying system for conveying plastic pellets, said system comprising a conduit, means for providing an air stream through said conduit, means for feeding said pellets into said air stream, and means for receiving said pellets from said conduit, the improvement comprising:
an interior wall within said conduit having, substantially throughout its length, spaced longitudinal serrations therearound to prevent smearing of said pellets on said conduit wall, said serrations forming alternate sharp crested ridges and grooves therebetween disposed longitudinally on said interior wall, and the distance between adjacent ridges is less than the smallest dimension of a nominal pellet to prevent said pellet from passing between said ridges and smearing on said conduit wall.

2. A pneumatic conveying system comprising:
a conduit;
means for providing an air stream through said conduit;
means for introducing polyethelene particles into said air stream; and
said conduit including alternating longitudinal sharp crested ridges and grooves around said conduit's inner wall, the separation between adjacent ridges being less than the smallest dimension of a nominal one of said particles so that said particles may ride on said ridges but may not pass between adjacent ridges to smear on said conduit inner wall.

3. A conduit for use as a part of a polyethelene pellet conveying system, said conduit including an inner wall having, and extending substantially its length, alternating longitudinal sharp crested ridges and valleys circumferentially around said wall, the separation between adjacent ridges being less than the smallest dimension of a nominal one of said pellets intended to be conveyed, so that said pellets are barred from passing between said ridges to smear on said conduit inner wall.

4. A method of conveying plastic particles having a tendency to smear from a source to a storage area, comprising:
causing said particles to enter a conduit which is intermediate said source and said storage area;
utilizing a source of pressured fluid to convey said particles through said conduit to said storage area, said conduit having a large number of longitudinally extending, closely spaced, sharp crested ridges whereby nominal ones of said particles are barred from passing intermediate said ridges to smear against the walls of said conduit.

5. The method of claim 4 wherein said plastic particles are polyethelene pellets and said pressured fluid is an airstream.

References Cited
UNITED STATES PATENTS

| | | | |
|---|---|---|---|
| 1,518,705 | 12/1924 | Raun | 302—64 |
| 2,784,038 | 3/1957 | Schneider | 302—64 |
| 3,117,821 | 1/1964 | Mylting | 302—64 |
| 3,224,814 | 12/1965 | Fischer | 302—64 |
| 3,380,783 | 4/1968 | Hunter | 302—64 |

FOREIGN PATENTS 262,044  8/1963  Great Britain.

ANDRES H. NIELSEN, Primary Examiner